United States Patent [19]

Curtil

[11] Patent Number: 5,048,473
[45] Date of Patent: Sep. 17, 1991

[54] METHOD AND APPARATUS FOR EQUIPPING A TWO-STROKE ENGINE WHICH IS SELF-SUPERCHARGED BY POST-CHARGING AND IN WHICH AN ADMISSION DUCT PROVIDES PRE-EXHAUST INTO A STORAGE CHAMBER

[76] Inventor: Rémi Curtil, 7, rue Fortuny 75017, Paris, France

[21] Appl. No.: 432,750
[22] PCT Filed: Mar. 25, 1988
[86] PCT No.: PCT/FR88/00155
§ 371 Date: Dec. 6, 1989
§ 102(e) Date: Dec. 6, 1989
[87] PCT Pub. No.: WO88/08073
PCT Pub. Date: Oct. 20, 1988

[30] Foreign Application Priority Data

Apr. 6, 1987 [FR] France .................................. 87 04757

[51] Int. Cl.⁵ ............................................. F02B 75/02
[52] U.S. Cl. ............................ 123/65 A; 123/73 PP; 123/73 AA; 123/316
[58] Field of Search ......... 123/73 PP, 65 PE, 73 AA, 123/73 SC, 316, 568, 47 R, 65 A

[56] References Cited

U.S. PATENT DOCUMENTS 1,362,080 12/1920 Chorlton ............................ 123/430
2,041,708 5/1936 Harper.
4,091,775 5/1978 Curtil .............................. 123/73 AA

FOREIGN PATENT DOCUMENTS

2607741 9/1977 Fed. Rep. of Germany.
2700991 7/1978 Fed. Rep. of Germany.
3137490 4/1983 Fed. Rep. of Germany.
886556 10/1943 France.
1461224 10/1966 France.
88612 1/1967 France.
2346558 10/1977 France.
2520803 8/1983 France ............................ 123/51 B
1016545 5/1983 U.S.S.R. ........................ 123/65 PE
294768 8/1928 United Kingdom.

*Primary Examiner*—David A. Okonsky
*Attorney, Agent, or Firm*—Cushman, Darby & Cushman

[57] ABSTRACT

The invention relates to a method and apparatus for arranging a post-charging two-stroke engine. The apparatus includes a post-charging system (16) including an air admission duct (22) to the cylinder (14). The duct communicates intermittently either with the source of scavenging air (A) or alternatively with a chamber (30) for storing gases under pressure. Advantageously, the chamber (30) is inside the piston (12), whereas the air admission duct (22) is formed by at least one curved duct going round the cylinder (14) and having sufficient volume to constitute a reserve of charging air for use in post-charging. The invention improves engine operation.

19 Claims, 5 Drawing Sheets

METHOD AND APPARATUS FOR EQUIPPING A TWO-STROKE ENGINE WHICH IS SELF-SUPERCHARGED BY POST-CHARGING AND IN WHICH AN ADMISSION DUCT PROVIDES PRE-EXHAUST INTO A STORAGE CHAMBER

BACKGROUND OF THE INVENTION

1. Field of the Invention

The present invention generally relates to a method and apparatus for equipping a two-stroke internal combustion (ic) engine of the type having reciprocating pistons and self supercharging by a post-charging effect, and in particular, although not exclusively, an engine having at least one single-acting cylinder.

2. Prior Art

In the prior art, a large number of proposals already exist for using the direct action of the gases leaving a cylinder to compress and introduce a reserve of air into a cylinder at an appropriate moment in the cycle in order to supercharge it.

Most of these proposals make use of the direct action of the exhaust gases from one cylinder, and vice versa, with the angular phase difference between the cylinders communicating in this way being judiciously selected (see Swiss patent No. CH 593.420).

Proposals for making the energy of exhaust gases in a cylinder act directly on an air reserve for improving the charging and efficiency of the same cylinder are much rarer, particularly if, for obvious reasons of efficiency, account is taken only of those proposals which enable the phases of transferring pressure from the cylinder to the air reserve and then to the cylinder to take place in a closed space within the system under consideration, in order to avoid any loss of energy to the outside.

For reasons of convenience, the set of components constituting the above-mentioned system is referred to below as a "compressor system".

In general, the term "scavenging air" is used below to specify the scavenging agent used for renewing the burnt gases in a cylinder, regardless of whether it is constituted by pure air or by some other mixture of fuel and oxidizer.

The number of proposals is even smaller if account is taken solely of those which provide a post-charging effect as opposed to a compression of the entire gas quantity admitted to the cylinder (which is difficult to achieve in a two-stroke cycle unless the exhaust back pressure is simultaneously increased).

The term "post-charging" is used to mean injecting an additional quantity of air into the cylinder after scavenging, and after the exhaust ports have been closed.

The advantage of post-charging has been known for a long time, in particular, for use in the two-stroke cycle.

For a given amount of external compression work applied to the quantity of air, post-charging provides an increased overall charging by raising air purity. This is because the mass of residual gases not expelled at the end of the scavenging phase remains unaltered during the post-charging phase and therefore becomes relatively smaller compared with the total mass of air contained in the cylinder after the post-charging effect. This is equivalent to improving the scavenging efficiency and to making better utilization of the scavenging air.

One such apparatus for a single cylinder post-charging two-stroke engine is described in U.S. Pat. No. 1,362,080 and is shown in FIG. 5 thereof.

In said apparatus, the compressor system comprises a supply of air external to the engine and connected at one of its ends to a volume constituting an anti-chamber to said air reserve and to a duct communicating with a source of scavenging air (via a three-way valve), and at its other end to the admission pipe leading to the admission port of the cylinder (controlled by fluid-flow control means, e.g. of the valve type, housed in the cylinder head), and to a first exhaust duct for evacuating the exhaust gases to the outside (again via a three-way valve), after they have been used.

The volume forming an anti-chamber to the air reserve is itself connected at its upstream end to a non-return valve located immediately downstream from a pre-exhaust opening connected to a pre-exhaust port (controlled by an opening provided in the liner) which is distinct from the exhaust port per se (also controlled by an opening provided in the liner) opening out to a second exhaust duct which is the exhaust duct from the cylinder.

Following the various sequences of the compressor system in cyclic order, the exhaust gases which, during the pre-exhaust phase (when the system formed by the cylinder and the anti-chamber is closed to the outside, the cylinder's exhaust port and the three-way valve downstream from said volume both being closed) escape from the cylinder via the pre-exhaust port and are stored under pressure in said volume while waiting to be transferred and hence transmit their pressure energy to the air previously stored in said reserve. The presence of the non-return valve makes it possible to maintain the pressure of the exhaust gases in said volume forming the anti-chamber.

In the following post-charging phase, the exhaust gases penetrate into the reserve (which at that moment is closed to the source of scavenging air and the first exhaust duct, but is in communication at its upstream end with said volume defining the anti-chamber, and at its downstream end with the cylinder admission pipe, again by virtue of each of the two above-mentioned three-way valves being suitably set), thereby compressing the air previously stored therein and urging it into the cylinder which then communicates with its admission pipe.

The compressor system cycle terminates with the scavenging period of the air supply in order to replace the burnt gases left therein after the post-charging phase with fresh air, again by setting the above-mentioned three-way valves to cause said reserve to communicate with the source of scavenging air at its upstream end and with the first exhaust duct at its downstream end (while simultaneously being closed relative to the anti-chamber volume and the admission pipe to the cylinder). It may be observed that more time is available for scavenging the air reserve which takes place during compression, combustion and expansion within the cylinder than for scavenging the cylinder per se.

It may also be observed, with particular reference to the compressor system and the admission phase of the engine cycle, that the main flow direction of the exhaust gases, of the air injected into the air reserve, and of the air injected into the cylinder is uni-directional, i.e. along the same direction from the pre-exhaust port to the downstream end of the air reserve situated in the vicinity of the cylinder admission pipe.

Although such apparatus implements a method corresponding to an ideal thermodynamic cycle, it suffers from the following drawbacks, in particular:

a) The external position of the air reserve and of the volume forming anti-chamber for the exhaust gases, and the need to provide three additional valves in order to provide fluid flow control timing during the compressor system cycle and the charging part of the engine cycle give rise to an assembly which is very complex and bulky. This mechanical complexity is difficult to justify, in particular for an application with multicylinder engines and in the current technical context where turbo-charging has become widespread.

b) These additional valves are either automatically actuated in which case they present a degree of unreliability when located in a flow of high temperature gas, or else they are mechanically actuated. The latter type gives rise to difficulties both for lubrication and as regards the speed at which they open and close. Moreover, they must have sufficient flow section areas to implement the gas exchange diagrams required by the compressor cycle and the charging part of the engine cycle.

c) The position of the additional valves necessarily gives rise to a certain number of dead zones since it is not always possible to control the exact position of the gas-air interface. This means either that burnt gases are admitted into the cylinder at the end of the post-charging phase or else that fresh air is lost during the subsequent scavenging period of the air reserve.

SUMMARY OF THE INVENTION WITH OBJECTS

One of the main aims of the invention is to avoid the above-mentioned drawbacks while retaining the main advantage of the known above-mentioned apparatus, i.e. that of providing self-supercharging by post-charging.

In this context, an essential aim of the invention is to simplify such apparatus and to facilitate the application thereof by accommodating the compressor system as much as possible within the various two-stroke engine designs which have become common practice, particularly, but not exclusively, for small single-cylinder engines which are very widely used in low power applications.

Another object of the invention is to allow a self supercharging of engines whose small number of cylinders or small cylinder capacity have heretofore made them unsuitable for supercharging, in particular for turbo-charging.

Yet another object of the invention is to make it easier to apply improved cycles having shorter internal compression strokes than expansion strokes, also referred to as asymmetric cycles. These cycles require a higher ratio of supercharging pressure to mean effective pressure than do symmetrical cycles. As a result, they very often lead to the use of an additional supercharging phase disposed in series, generally with inter-cooling being interposed. The invention then makes it possible to dispense with one of the supercharging stages, or to obtain an additional supercharging phase.

An additional object of the invention is to confer improved characeristics to this type of engine compared with the characteristics of existing engines with respect to specific output, power, fuel consumption, pollution emission including noise emission and torque characteristics.

The improvement in the specific output power and the increase in turbulence induced by the high air in flow velocities resulting from the post-charging phase are considered as being overriding factors that will allow the diesel engine to take advantage of its potential which is currently insufficiently exploited in some applications, in particular for small unit displacement.

Another object of the invention is to obtain a trapping efficiency of the quantity of air supplied to the cylinder that is as close as possible to unity, in other words, to reduce the losses of scavenging air to the exhaust to as small a value as possible, thereby maintaining the highest possible enthalpy of the exhaust gases while avoiding the dilution phenomenon as much as possible, to allow subsequent use of the exhaust gas energy in a supercharging turbine or a power turbine.

It is therefore an underlying object of the present invention to overcome the aforesaid disadvantages by proposing a process and apparatus having improved characteristics.

The present invention indeed proposes a method of equipping a two-stroke internal combustion engine having reciprocating pistons and which is self-supercharged by a post-charging effect, in particular an engine having at least one single-acting cylinder in which all pressure exchange phases between the gases concerned take place essentially in a closed space within a compressor system, characterized in that said method consists in completely integrating the compressor system with the cylinder-cylinder head assembly, by using for the cylinder working chamber exclusively at least one admission port and at least one exhaust port, one of said ports additionally serving to provide a pre-exhaust function.

In a preferred implementation of the invention, the method is characterized in that an air storage chamber is provided in the compressor system and is connected to the charging part of the engine cycle in such a manner that the sequence of successive phases enables the exhaust gases, during the pre-exhaust phase, to penetrate into a feed passage to the air storage chamber by the same passage that conveys air to the cylinder, thereby compressing the air occupying said passage inside said storage chamber during a waiting period for the post-charging phase, then enabling the air from a cylinder scavenging source to scavenge said feed passage during a scavenging phase and then to scavenge the cylinder itself while ejecting the exhaust gases, and finally enabling the air previously accumulated under pressure in the air storage chamber to return its energy during the post-charging phase to the air present in said feed passage which is then in communication with the cylinder.

The invention also provides for the air storage chamber function and the gas exchange control function respectively to be provided exclusively by co-operation between the cylinder and the piston.

In particular, the invention provides for the air storage chamber to be delimited by an internal volume in the piston.

This proposal has the advantage of giving rise to a thermodynamically ideal cycle as defined above without calling on any additional control member making use of additional moving parts.

It also has the advantage of retaining the compactness of a two-stroke engine.

It may be observed that the organization of the scavenging of the feed passage to the air storage chamber, which coincides with the downstream portion of the cylinder admission passage, and thereafter the scavenging of the cylinder per se using a single front of air coming from the scavenging air source, makes it possible to completely eliminate the above-mentioned drawback of dead zones.

Most types of gas exchange control means and most types of air source, and indeed most types of scavenging common on two-stroke engines can be used in conjunction with the invention. With respect to types of gas exchange control means, the invention is not limited to exhaust and admission ports provided in the cylinder wall in the form of openings, but is also applicable to valves received in the cylinder head. With respect to the air source, any known form of air source capable of providing the necessary air flow rate for scavenging purposes and enabling air to arrive from beneath the piston may be used, in particular:

a positive displacement type pump of the type which is integrated in or internal to the engine, such as a crankcase pump system, or a space beneath the piston for a crosshead engine, or of the externally driven type;

an external blower driven mechanically or by the exhaust gases; or any combination of the above two systems.

It may be observed that the two phases corresponding respectively to putting the air storage chamber under pressure and to self-supercharging by post-charging are, by the very nature of the type of gas exchange control which is ensured by piston displacement, symmetrically disposed relative to the bottom dead center position of the engine cycle.

The crank angle position and duration of the two above-mentioned phases may, however, be selected from within a very wide range running from a zone close to bottom dead center suitable for retaining a maximum effective compression stroke to, on the contrary, any desired zone on the compression stroke.

The volume of the feed passage and the volume of the air storage chamber are naturally a function of the type of crank angle diagram used for the above-mentioned pressure exchange phases.

The application of this arrangement does not require any additional technical problem to be solved other than that of cooling the feed passage to the air reserve and from the air storage chamber itself, with such cooling serving well-known purposes and not requiring a new technical problem to be solved.

The solution which consists in providing pre-exhaust in the admission passage to the cylinder has the advantage, when the above-mentioned passage cooling is provided, of cooling only those exhaust gases which are used for self-supercharging and not all of the exhaust gases as would otherwise happen if pre-exhaust were performed on the exhaust passage, which would give rise to a damaging loss of enthalpy if the invention were being used in conjunction with an additional supercharging system or with an external power turbine.

The method of the invention is suitable for numerous industrial applications, in particular for diesel engines or spark ignition engines which have hitherto been impossible or very difficult to supercharge.

According to a second aspect, the present invention also provides apparatus for equipping a two-stroke internal combustion engine having a reciprocating piston and which is self-supercharged by a post-charging effect in particular an engine having at least one single-acting cylinder, in which all pressure exchange phases between the gases concerned take place essentially in a closed space within a compressor system including a post-charging system, characterized in that the post-charging system uses either a cylinder-air admission duct or a cylinder-exhaust gas duct, respectively communicating, in alternation, with either the scavenging air source or the exhaust system and a chamber for storing gas under pressure.

In a preferred embodiment, apparatus in accordance with the invention is characterized in that the post-charging system includes the air admission duct to the cylinder, which duct communicates intermittently either with the source of scavenging air or else with a chamber for storing gases under pressure. In practice, this gas is constituted by some of the scavenging air.

A variant embodiment of apparatus in accordance with the invention is characterized in that the air admission duct opens out at its downstream end into the cylinder at a level higher than that of the port of the exhaust duct to provide a pre-exhaust via the admission duct in order to fill said storage chamber.

In a particularly advantageous embodiment of apparatus in accordance with the invention, the apparatus is characterized in that the storage chamber is inside the piston and connected to the upstream end of the air admission duct of the cylinder via at least one opening provided in the piston and put intermittently into communication with said air admission duct by the normal motion of the piston in the cylinder. Preferably, the storage chamber is annular in shape between the housing for the connecting rod or the piston rod and the outer skirt of the piston.

In a particular variant embodiment of the piston, said piston includes an air intake duct running from the air source and intermittently terminating at the upstream end of the air admission duct to the cylinder by virtue of the normal motion of the piston in the cylinder. This makes it very simple to put the source of air into communication with the inlet to the cylinder admission duct. Preferably, this air intake duct communicates downstream via openings with an annular duct disposed above the storage chamber and beneath the piston head.

In another particular embodiment of apparatus in accordance with the invention, the apparatus is characterized in that the air admission duct is formed by at least one curved duct going round the cylinder in order to have sufficient volume to constitute a reserve of charging air serving for post-charging.

In this way, all of the above-mentioned decisive technical advantages for the method are obtained.

BRIEF DESCRIPTION OF THE DRAWINGS

The presently preferred embodiment of apparatus in accordance with the invention, implementing the method of the invention, is described by way of example with reference to the accompanying drawings, in which.

DESCRIPTION OF THE PREFERRED EMBODIMENTS

Figure 1A:
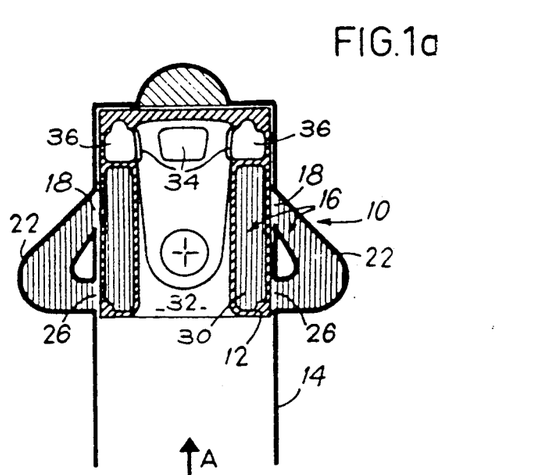
FIGS. 1a and 1b are a vertical axial section through a cylinder of a two-stroke internal combustion engine having reciprocating pistons and self-supercharged by the post-charging effect in accordance with the presently preferred embodiment of the invention. In these figures the piston is at top dead center (TDC) with the connecting rod (or the piston rod of a crosshead engine) being omitted for the sake of clarity.
Figure 1B:
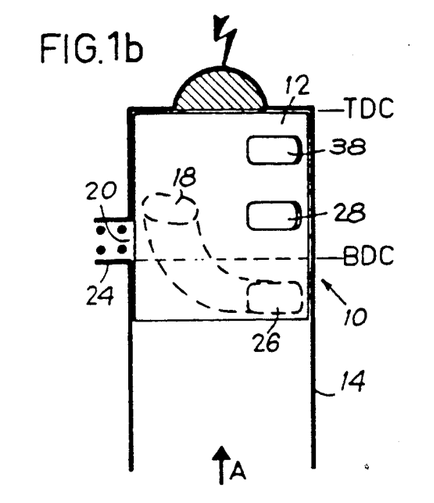
Figure 2:
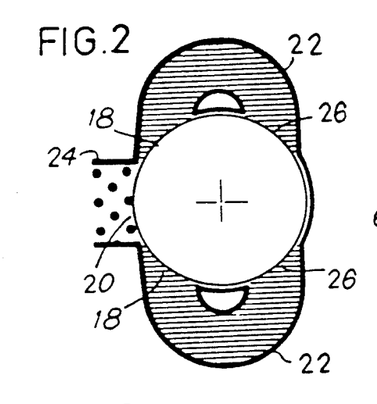
FIG. 2 is a plan view of the cylinder shown in FIGS. 1a and 1b with the admission and exhaust ducts partially cut-away.

With reference in particular to FIGS. 1a and 1b, reference numeral 10 generally designates apparatus in accordance with the invention for equipping a two-stroke internal combustion engine having a reciprocating piston 12 and self-supercharging by a post-charging effect, and in particular an engine having at least one cylinder 14.

The engine includes a post-charging system 16.

The apparatus in accordance with the invention comprises, in this case, two admission ports 18 disposed symmetrically in the liner of the cylinder 14, together with a single exhaust port 20 (clearly visible in FIG. 1b), although a larger number of exhaust ports could be provided.

In accordance with the invention, the post-charging system 16 comprises one of the admission or exhaust ports 18 or 20 respectively associated with the corresponding admission duct 22 or exhaust duct 24 which provides pre-exhaust and also serves respectively as an admission passage or as an exhaust passage, and as the post-charging passage.

In the example shown in FIGS. 1 to 6, it is the admission port 18 associated with its admission duct 22 which provides pre-exhaust, serves as an admission passage, and as a post-charging passage.

To this end, the admission duct 22 communicates intermittently either with the source of scavenging air symbolized by arrow A (which in most cases is constituted by a positive displacement pump type) or alternatively with a chamber 30 for storing gas under pressure.

In a particularly advantageous embodiment, the downstream end of the admission duct 22 gives onto the cylinder via the port 18 at a level higher than that of the exhaust port 20 for the purpose of filling the storage chamber 30.

In the presently preferred embodiment, the admission duct 22, at its upstream end, gives onto the cylinder via a port 26 which is shown here as being permanently covered by the piston throughout its stroke and which is situated beneath the exhaust port 20. The storage chamber 30 is provided inside the piston 12 and is connected via at least one port 28 provided in the piston 12 (and clearly visible in FIG. 3a) which is intermittently put into communication with the upstream end of the air admission duct 22, i.e. with port 26, by virtue of the normal motion of the piston 12. The storage chamber is preferably annular in shape between the housing for the connecting rod or the piston rod and the outer skirt of the piston 12.

In a particular variant, the piston 12 includes an air intake duct 32 which is shown as being internal in this case, and which is constituted, for example, by the housing required for articulating the connecting rod to the piston 12. This duct 32 communicates at its upstream end with the source of air A and at its downstream end, via ports 34, with an annular duct 36 disposed above the storage chamber 30 beneath the piston head and which intermittently communicates with the upstream end of the admission duct 22 via two ports 38 which are clearly visible in FIGS. 4a, 4b, 5a and 5b. The position in which these ports 38 communicate with the admission duct 22 is shown clearly in FIG. 5a (the bottom dead center position) in the middle of the scavenging phase.

In another particularly advantageous embodiment of apparatus in accordance with the invention, the admission duct 22 is constituted by at least one curved duct (clearly visible in the figures) going round the cylinder 14 in order to provide sufficient volume to constitute a reserve of charging air for post-charging purposes, as explained below with reference to the method of operation of the engine.

In accordance with another characteristic of the apparatus in accordance with the invention, the length of the piston 12 is such that at top dead center the piston 12 closes the upstream port 26 of the admission duct 22, with said position being clearly visible in FIGS. 1a and 1b.

In a variant embodiment, the volume of the storage chamber 30 normally represents about 30% to about 60% of the displacement of the cylinder 14.

Figure 4A:
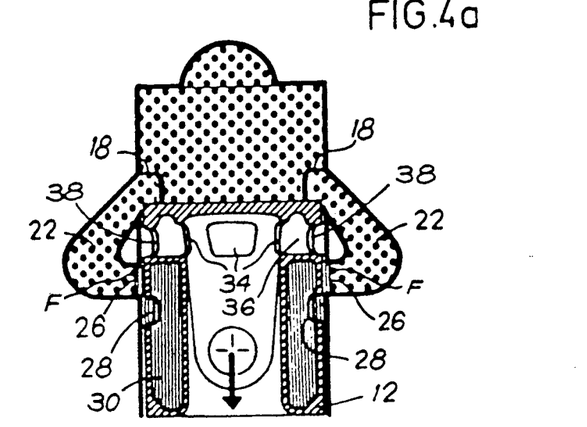
FIGS. 4a and 4b are similar views to FIGS. 1a and 1b but show the piston at the beginning of the exhaust phase.

In addition, it is advantageous for the volume of the admission duct 22 and the volume of the storage chamber 30 to be designed according to the swept volume of the cylinder 14 and the thermodynamic conditions in the cylinder 14 at the beginning of the pre-exhaust in such a manner that the interface front F separating the pre-exhaust gases from the air which is swept towards the storage chamber 30 preferably to avoid penetration into the storage chamber 30 at the end of the pre-exhaust phase (see FIG. 4a).

It should be observed that the total volume of the admission ducts 22 is slightly less than the volume of the storage chamber 30 and is a function of the thermodynamic operating conditions of the cycle, and in particular of the air/fuel ratio. The lower the air/fuel ratio and the closer to the stoichiometric ratio, the higher the self-supercharging by the post-charging effect, which is generally achieved by increasing the volume of the admission ducts 22.

Also, the volume of the storage chamber 30 and the volume of the admission duct 22 depend on the volume of the combustion chamber defined by the position of the piston at the beginning of the pre-exhaust phase.

Figure 7:
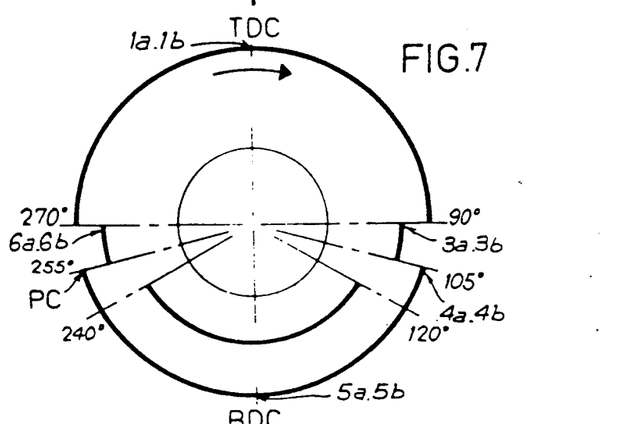
FIG. 7 shows an example of a cycle operating diagram for an engine in accordance with the invention.

The cycle of such an engine equipped with apparatus in accordance with the invention is now described on the basis of the operating diagram shown in FIG. 7.

To this end, the various fluids are distinguished by representing the burnt pre-exhaust or exhaust gases as solid circles which come closer together with increasing pressure, the scavenging admission air by open circles which likewise come closer together or further apart depending on pressure and finally the air present in the storage chamber 30, which acts as a pneumatic spring between two extreme positions, by lines which are drawn closer together or further apart depending on pressure. With the phase of maximum pressure being shown in FIGS. 4a, 4b, 5a and 5b, and with the phase of minimum pressure equal to the pressure at the end of post-charging being shown in FIGS. 6a, 6b; 1a, 1b; 3a and 3b.

Figure 3A:
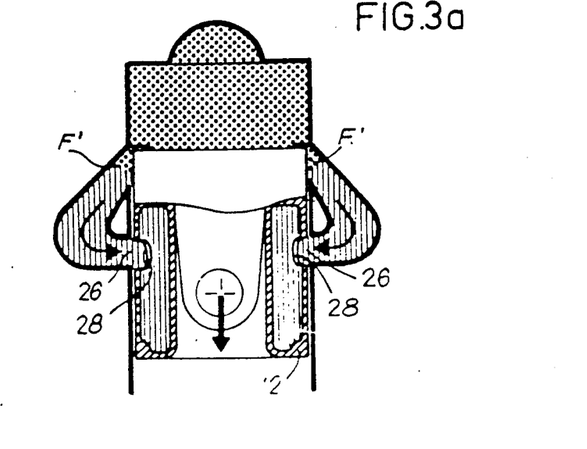
FIGS. 3a and 3b are similar views to FIGS. 1a and 1b but show the piston in a beginning of pre-exhaust position.
Figure 3B:
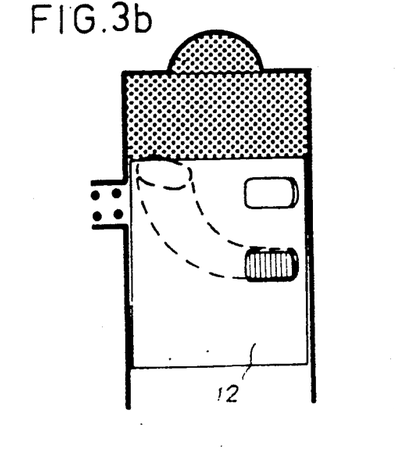
Figure 8:
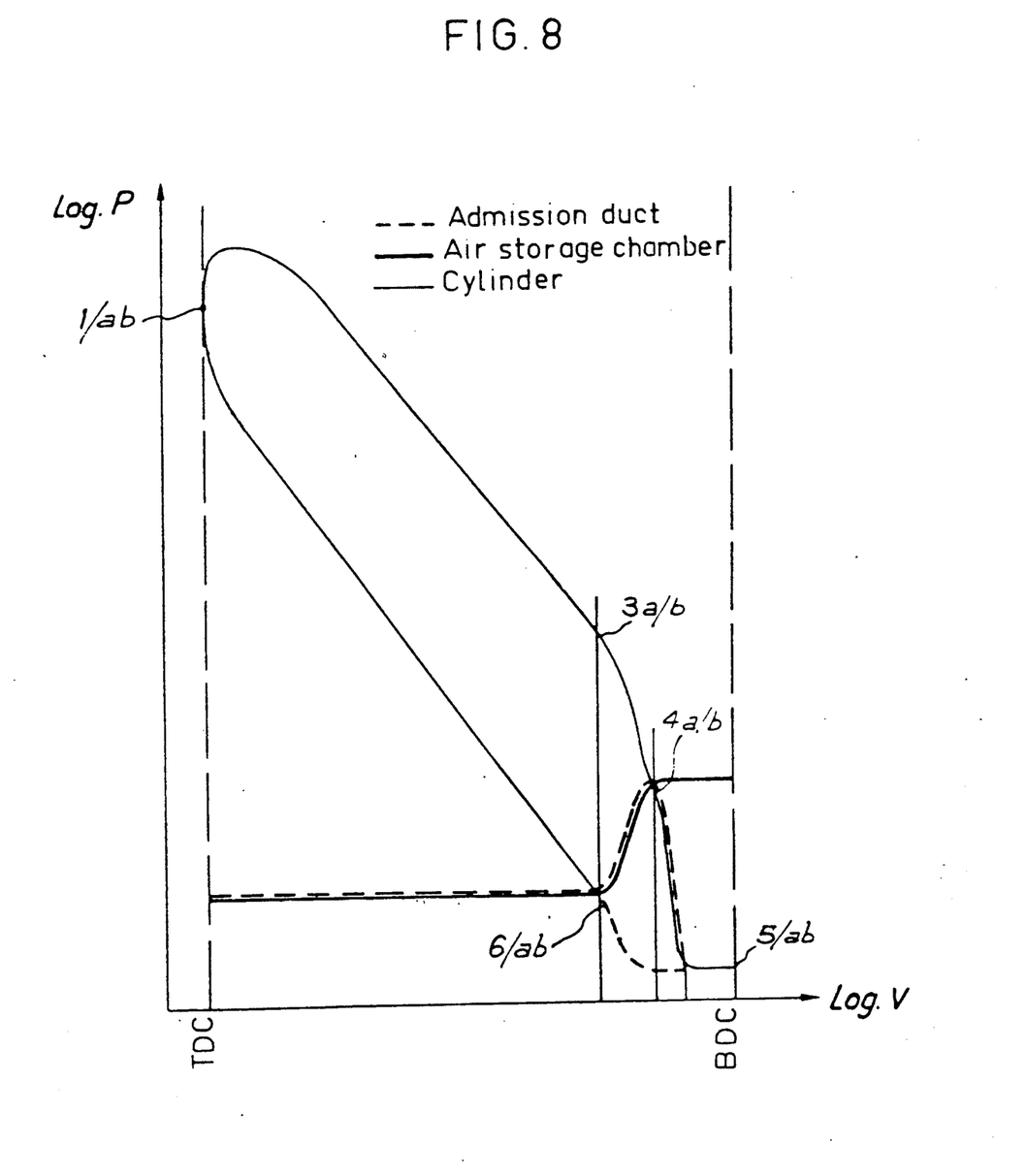
FIG. 8 is a logarithmic diagram of pressures versus cylinder volume during a cycle, with the dotted line being the pressure diagram of the admission duct (22), the thick continuous line curve being the pressure diagram for the storage chamber (30), and with the fine continuous line curve being the pressure diagram for the cylinder working chamber; the piston positions shown successively in FIGS. 1a, 1b; 3a, 3b; 4a, 4b; 5a, 5b; and 6a, 6b are marked on the corresponding locations of the pressure diagram in the FIG. 8.

Thus, starting from the piston in its top dead center position as shown in FIGS. 1a and 1b, in which the air admission duct 22 and the storage chamber 30 are filled with air at a minimum pressure level, the crank shaft turns through an angle of 90° in order to reach the beginning of pre-exhaust position shown in FIGS. 3a and 3b. During this rotation, it will be understood that the piston would already have begun its downstroke and that expansion would have taken place, as is clearly shown by the pressure curves in FIG. 8. At this point, pre-exhaust begins into the admission duct 22 while port 28 puts the storage chamber 30 into communication with the upstream port 26 of the admission duct 22. During this pre-exhaust phase, it will readily be understood that the air shown in heavy continuous lines is recompressed, by being urged towards the storage chamber 30, thereby constituting a pneumatic spring.

Figure 4B:
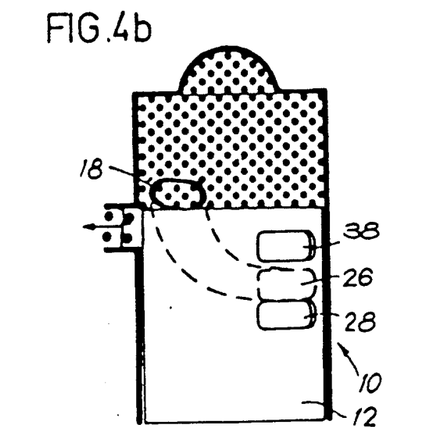

As the crank shaft continues to rotate, for example through an angle of 15°, the position shown in FIGS. 4a and 4b is reached, i.e. the end of the pre-exhaust phase. At this phase the front F is situated substantially level with the port 26 of the admission duct 22. Thus, the air constituting the pneumatic spring is at this particular moment compressed to a maximum pressure and is entirely contained in the storage chamber 30.

The end of the pre-exhaust phase naturally coincides with the beginning of the exhaust phase as shown in FIG. 4b.

Thereafter, during rotation through a further 15°, for example, as required to obtain a drop of pressure in the cylinder and in the admission duct 22 down to the scavenging pressure provided by the source of air A, the piston 12 continues its stroke to the moment when port 38 comes level with port 26 of the admission duct 22, at which moment the scavenging phase begins with the duct 22 being scavenged.

The description of the scavenging phase begins with interface front F shown in FIG. 4a being pushed back within the admission ducts 22 towards the cylinder, with scavenging of the cylinder per se only beginning after the front F has reached port 18.

Figure 5A:
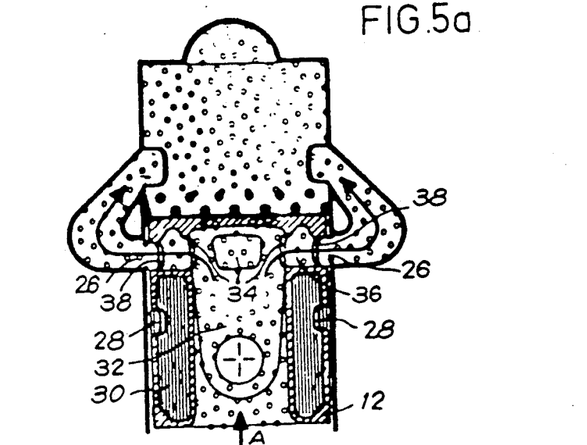
FIGS. 5a and 5b are views similar to FIGS. 1a and 1b but show the piston at the bottom dead center (BDC)
Figure 5B:
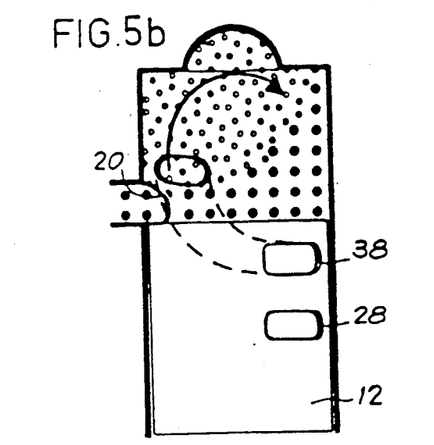

The crank shaft continues to rotate and reaches bottom dead center BDC as shown in FIGS. 5a and 5b. In this position the engine is in the middle of the scavenging phase in which it can be seen from FIGS. 5a and 5b that the proportion of exhaust gases remaining in the cylinder has already been greatly reduced.

The crank shaft continues to rotate until it reaches an angle of rotation of 240°, in which position the piston closes communication between the ports 26 of the admission ducts 22 and the ports 38 of the piston 12, and then after a further rotation of the crank shaft through 15°, the exhaust port 20 is in turn closed by the piston 12. It is at this instant that post-charging begins as designated by the letters P.C. in FIG. 7.

Figures 6A, 6B:
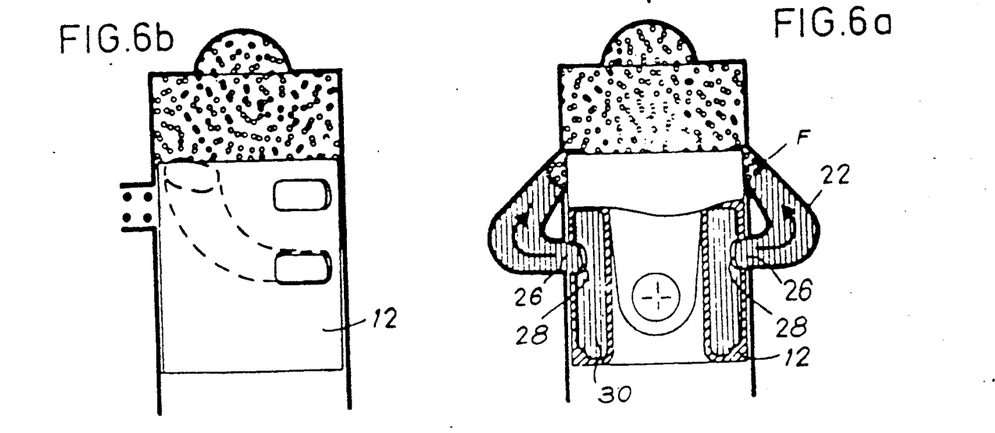
FIGS. 6a and 6b are views similar to FIGS. 1a and 1b but show the piston at the end of the post-charging phase.

Post-charging continues in this case, for example, through a further angle of 15° of crank shaft rotation until the end of post-charging position is reached as shown in FIGS. 6a and 6b.

It may be observed that during this post-charging phase, the air constituting the pneumatic spring stored under maximum pressure in the storage chamber 30 escapes into the admission duct 22 by the ports 28 being put into communication with the ports 26, as shown clearly in FIG. 6a. This intermediate position of FIG. 6a is identical to the intermediate position of FIG. 3a.

It may be observed that at the end of post-charging the intermediate front F' is shown in this case as remaining within the admission duct 22 (although close to the cylinder), but since it is merely preferred that the burnt gases do not penetrate into the storage chamber 30, there is nothing to prevent said front F' from penetrating into the cylinder under some operating conditions.

Continuing rotation of the crank shaft to the top dead center position provides the conventional compression of the compression phase of the cycle preceding the ignition and combustion phase. Throughout this phase, the air which expanded during post-charging remains in the storage chamber 30 at said expanded, minimum pressure level, as it does in the admission ducts 22 until the beginning of the pre-exhaust shown in FIG. 3a.

It will be observed that with the invention, and as described in above-mentioned Swiss patent document CH-593 420 in the name of MOTOSACOCHE, that self-supercharging by the post-charging effect and the turbulence induced in the combustion chamber are more pronounced at low revolutions.

It will be observed that the natural characteristic gives rise to an extreme position of the front F as shown herein which is closer to the storage chamber 30 the lower the revolutions at which the engine is operating.

Naturally the invention includes any means constituting technical equivalents of the means described and various combinations thereof.

In particular, the respective positions of the various ports could be changed so as to allow for a degree of overlap between the pre-exhaust, the exhaust, the scavenging, and the post-charging phases.

In particular, the presence of a degree of overlap between the opening of the exhaust port and the closing of communication between the storage chamber 30 and the upstream end of the admission duct 22 makes it possible to vary the extreme position of the front F, and in the limit to obtain an extreme position for said front F which is substantially constant regardless of the revolutions at which the engine is operating.

In accordance with the invention, the duration of post-charging, and its position within the cycle, both during the pre-exhaust phase and during the post-charging phase may be determined arbitrarily, which is a major advantage compared with prior systems.

It will be observed that the configuration provided of the piston 12 with an annular duct 36 delimited outwardly by the top of the piston skirt and inwardly by the walls forming the dome transmitting force to the piston rod or hinge impart thermal and mechanical axial symmetry to the assembly. This axial symmetry naturally makes it possible to obtain conditions which are extremely favorable for cooling the piston and consequently gives rise to extremely favorable conditions for selecting the piston-to-liner operating clearances. If the external control of liner cooling is also uniform and axially symmetrical, it is possible to make a piston which is exactly cylindrical, and this is a considerable manufacturing advantage.

Advantageously, the temperature level of the admission ducts 22 and of the piston 12 may be controlled by suitable cooling. In which case any conventional cooling means may be used, for example:

cooling fins if the engine is air-cooled; or a water chamber or bore which may be drilled or integrally cast if the engine is water-cooled, which technique is also known as "bore cooling".

It should also be observed that in the drawings for the purpose of simplification and given that the admission ducts 22 wind round the cylinder, ports which are not necessary are sometimes omitted, whereas in other cases ports which are not in the same plane nor in the plane of the drawing are nevertheless shown in the plane of the figures together with an index a in order to facilitate comprehension.

It should also be observed that the operating cycle of the post-charging cycle per se, during its initial pre-exhaust phase, its exhaust phase, and the beginning of scavenging, is to a large extent governed by unsteady phenomena in a manner analogous to "COMPREX" or to the operation described in Swiss patent document CH-A-593 420, making it possible to take advantage of self-scavenging, either in addition to the positive scavenging achieved by means of a positive displacement pump or a blower, or alternatively in the limit for certain operating points of the engine, as the only scavenging means.

At the cost of a degree of deterioration in the efficiency of the proposed self-supercharging cycle, it should be observed that it is always possible to shorten the length of the piston such that in the vicinity of top dead center the piston skirt does not cover the port 26 to the upstream end of the admission duct 22, which means that the air contained in the duct 22 is discharged at the end of post-charging into the space beneath the piston and connected to the source of air A. This may be advantageous when the two-stroke engine is valve ported rather than being liner ported, thereby avoiding the need to have a piston that is long enough to cover the exhaust port.

Figure 9A:
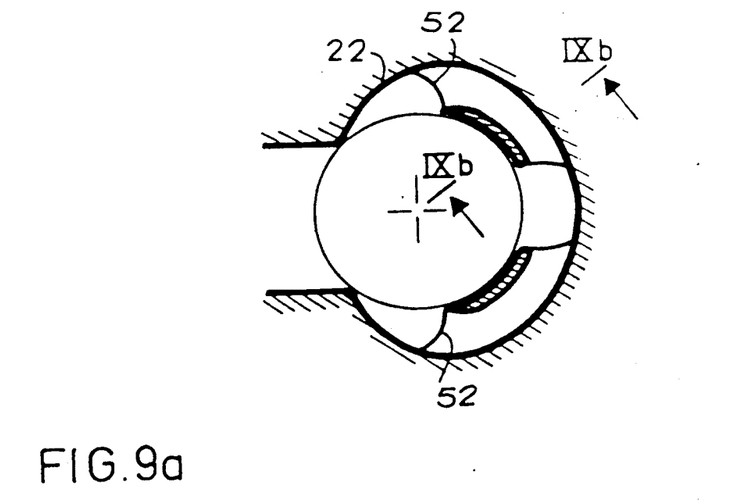
FIGS. 9a and 9b show a variant embodiment of the admission ducts including cooling means arranged to enhance the gas flow in said ducts together with a sharp interface F between the pre-exhaust gases and the scavenging air.

Another possible modification as shown in FIG. 9a lies in the fact that if there are at least two admission ducts 22 as shown, then the ports 26 of the upstream ends of the ducts 22 may coincide so as to constitute a single port with the two upstream ends of the admission ducts 22 meeting level with said single port. It can be seen in FIG. 9a, as in FIG. 2, that the admission ducts 22 are disposed symmetrically about the scavenging plane of symmetry which substantially coincides with the longitudinal plane of symmetry of the cylinder passing through the exhaust ports 20.

Figure 9B:
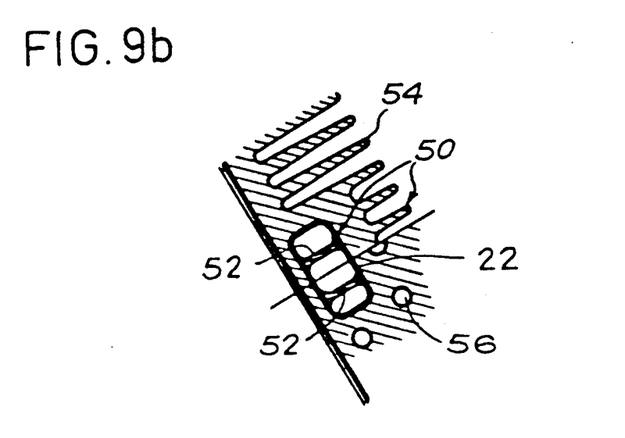

FIG. 9b shows cooling means 50 arranged to enhance the gas flow in the admission ducts 22 together with sharp interfaces F between the pre-exhaust gases and the scavenging air. For example, these cooling means 50 comprise transverse partitions 52 enabling the heat to travel towards conventional cooling means external to the ducts 22, such as fins 54 or bore cooling type cooling ducts 56.

Figure 10:
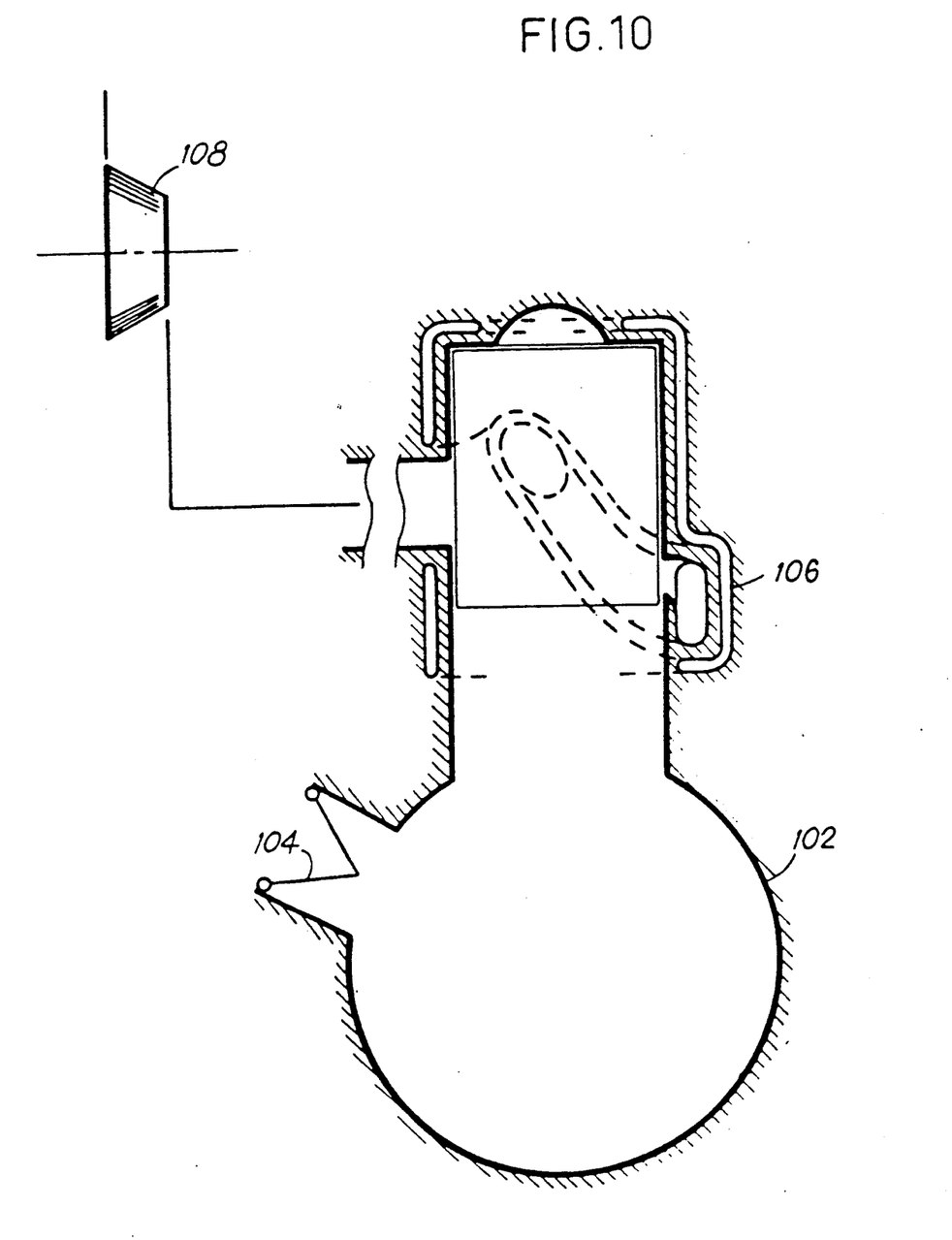
FIG. 10 is a diagrammatic fragmentary section through an engine fitted with a device in accordance with the invention as shown in any of the preceding figures, not depicted for simplification but showing the provision of a source of air by means of a crankcase pump fitted, in this case, with an admission via a non-return valve. Possible cooling of the admission ducts by means of a water chamber is shown, together with a turbine which is either the high pressure phase turbine of a turbo-compressor, or alternatively a power turbine capable of being mechanically coupled to the engine.

FIG. 10 shows an engine 100 fitted with apparatus in accordance with the invention, the engine including a crankcase pump 102, a non-return valve feed 104, water chamber cooling 106, and a turbine 108.

In addition, in an advantageous variant implementation of the method of the invention, by switching off the engine cooling circuit, the engine, and in particular the feed passages including the admission ducts, is not cooled under low load, with cooling being performed from intermediate loads up to maximum load by opening the cooling circuit.

The absence of cooling at low loads enables the temperature of the admission air to be raised by the heating provided by the walls of the admission ducts, which are themselves heated by the pre-exhaust gases.

Raising the temperatures of the admission gases increases their volume and thus reduces the volume of residual exhaust gases in the cylinder, thereby having a favorable effect on the lower limit of stable low load combustion of the mixture of scavenging air and residual gases, particularly in spark ignition engines.

What is claimed is:

1. A method for self-supercharging by a post-charging effect with fresh charge, a two-cycle reciprocating piston internal combustion engine having at least one cylinder and piston mounted for reciprocation in the cylinder, comprising the steps of:

exchanging pressure phases between an intake charge and an exhaust charge through a gas interface existing between said charges and which remains during a subsequent scavenging step, the exchanging occurring within a closed compressor system comprising the combustion chamber having at least one transfer port and at least one exhaust port; and partially pre-exhausting the combustion chamber through the transfer port into a transfer duct in communication with said transfer port with said transfer duct leading to a storage chamber located in said piston.

2. A method as in claim 1 and further comprising the steps of:

upon pre-exhausting the exhaust charge through the transfer duct to said storage chamber, compressing a volume of air in the transfer duct into the storage chamber;

scavenging the transfer duct and cylinder with an intake charge from an intake supply source;

exhausting the exhaust charge from the cylinder through the exhaust port; and releasing the pressurized air in the storage chamber to post-charge the intake charge in the transfer duct into the cylinder.

3. A method as in claim 1 and further comprising the step of:

moving the piston with relation to the cylinder to open and close the transfer duct.

4. A method as in claim 1, and further comprising the step of cooling the transfer duct.

5. A method as in claim 4, wherein the cooling step is interrupted at low engine loads.

6. A method as in claim 1, and further comprising the step of:
   externally supercharging the engine.

7. A method as in claim 6, wherein the supercharging step comprises the step of:
   driving a turbocharger with the exhaust charge from the engine to supercharge the engine.

8. An apparatus for self-supercharging by post charging, a two-cycle reciprocating piston internal combustion engine having at least one cylinder, comprising:
   a storage chamber in the piston;
   at least one transfer duct, a first end of which communicates with the cylinder and a second end of which alternately communicates with an intake charge source and the storage chamber.

9. An apparatus as in claim 8, wherein the first end of the transfer duct is positioned at a higher point within the cylinder than an exhaust port such that the first end of the transfer duct opens before the exhaust port on a piston downstroke to allow the exhaust charge to pre-exhaust into the transfer duct.

10. An apparatus as in claim 8, wherein the storage chamber communicates alternately with the second end of the transfer duct through a port in the piston as the piston reciprocates.

11. An apparatus as in claim 8, wherein the storage chamber is annularly formed within the piston between a connecting rod and a piston skirt.

12. An apparatus as in claim 8, wherein the piston comprises an intake port intermittently communicating the intake charge source with the transfer duct as the piston reciprocates.

13. An apparatus as in claim 12, wherein the intake charge source communicates with the piston intake port sequentially through a passage in the piston communicating with a piston intake duct positioned between the storage chamber and a head of the piston.

14. An apparatus as in claim 8, wherein the transfer duct comprises at least one curved conduit extending around the cylinder and having an interior volume sufficient to provide a charging air reserve for post charging the cylinder.

15. An apparatus as in claim 8, wherein at top dead center, a piston skirt closes the second end of the transfer duct.

16. An apparatus as in claim 8, wherein a volume of the storage chamber is between 30% and 60% of a volume equal to the cylinder volume.

17. An apparatus as in claim 8, wherein a volume of the storage chamber and a volume of the transfer duct relate to a volume of the cylinder and thermodynamic conditions in the cylinder at the moment of pre-exhaust such that an interface front separating the pre-exhaust gas from the compressible air in the transfer duct and storage chamber does not enter the storage chamber at the end of the pre-exhaust.

18. An apparatus as in claim 8, wherein a total volume of the transfer duct is less than a total volume of the storage chamber and is a function of the thermodynamic conditions of the engine, including an air/fuel ratio of the intake charge.

19. An engine equipped with an apparatus according to one of claims 8-18.

* * * * *